United States Patent
Paska et al.

(10) Patent No.: US 10,916,789 B2
(45) Date of Patent: Feb. 9, 2021

(54) ALKALINE EXCHANGE MEMBRANE FUEL CELLS SYSTEM HAVING A BI-POLAR PLATE

(71) Applicant: HYDROLITE LTD, Caesarea (IL)

(72) Inventors: Yair Paska, Kiryat Ata (IL); Miles Page, Hod Hasharon (IL); Yair Benjamine, Petah Tikva (IL); Shimshon Gottesfeld, Nishyuna, NY (US)

(73) Assignee: HYDROLITE LTD, Caesarea (IL)

( * ) Notice: Subject to any disclaimer, the term of this patent is extended or adjusted under 35 U.S.C. 154(b) by 0 days.

(21) Appl. No.: 16/085,648

(22) PCT Filed: Mar. 21, 2017

(86) PCT No.: PCT/IL2017/050356
§ 371 (c)(1),
(2) Date: Sep. 17, 2018

(87) PCT Pub. No.: WO2017/163244
PCT Pub. Date: Sep. 28, 2017

(65) Prior Publication Data
US 2019/0088965 A1 Mar. 21, 2019

(30) Foreign Application Priority Data
Mar. 21, 2016 (IL) .......................... 244698

(51) Int. Cl.
*H01M 8/083* (2016.01)
*H01M 8/023* (2016.01)
(Continued)

(52) U.S. Cl.
CPC .......... *H01M 8/083* (2013.01); *H01M 4/881* (2013.01); *H01M 4/8807* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,533,453 A | 8/1985 | Oda et al. | |
| 4,740,287 A | 4/1988 | Cawlfield | |

(Continued)

FOREIGN PATENT DOCUMENTS

| | | |
|---|---|---|
| AT | 389020 | 2/1989 |
| CN | 101022171 | 8/2007 |

(Continued)

OTHER PUBLICATIONS

Arisetty S. et al. "Metal foams as flow field and gas diffusion layer in direct methanol fuel cells", Journal of Power Sources, vol. 165, Issue 1, Feb. 25, 2007, pp. 49-57.

(Continued)

*Primary Examiner* — Christopher P Domone
(74) *Attorney, Agent, or Firm* — Pearl Cohen Zedek Latzer Baratz LLP (57) ABSTRACT

The invention relates to a system and method of operating alkaline exchange membrane fuel cells in a bipolar configuration. The system (400) may include a first fuel cell (300A) and a second fuel cell (300B) adjacent to the first fuel cell. Each of the first and second fuel cells may include: a cathode configured to generate hydroxide ions from water, oxygen and electrons, an anode configured to generate water and electrons from the hydroxide ions and hydrogen received from a hydrogen source, and an alkaline exchange membrane configured to transfer the hydroxide ions from the cathode to the anode, and to transfer water from a vicinity of the anode to a vicinity of the cathode. The first fuel cell (300A) and a second fuel cell (300B) are connected by a porous bipolar plate (430A) positioned inbetween. A pressure profile across the first bi-polar plate may drop from (Continued)

higher level near the anode of the first fuel cell (300A) to lower level near the cathode of the second fuel cell (300B) so that water may be transferred from the anode of the first fuel cell (300A) to the cathode of the second fuel cell (300B).

10 Claims, 7 Drawing Sheets

(51) Int. Cl.
*H01M 8/0289* (2016.01)
*H01M 8/0258* (2016.01)
*H01M 8/1062* (2016.01)
*H01M 8/1067* (2016.01)
*H01M 4/88* (2006.01)
*H01M 8/04119* (2016.01)
*H01M 8/0267* (2016.01)
*H01M 8/0234* (2016.01)
*H01M 8/0232* (2016.01)
*H01M 8/04029* (2016.01)

(52) U.S. Cl.
CPC ......... *H01M 8/023* (2013.01); *H01M 8/0258* (2013.01); *H01M 8/0289* (2013.01); *H01M 8/04119* (2013.01); *H01M 8/1062* (2013.01); *H01M 8/1067* (2013.01); *H01M 8/0232* (2013.01); *H01M 8/0234* (2013.01); *H01M 8/0267* (2013.01); *H01M 8/04029* (2013.01)

(56) References Cited

U.S. PATENT DOCUMENTS

| | | | |
|---|---|---|---|
| 5,362,366 | A | 11/1994 | De-Nora et al. |
| 5,503,944 | A | 4/1996 | Meyer et al. |
| 5,700,595 | A | 12/1997 | Reiser |
| 5,942,347 | A | 8/1999 | Koncar et al. |
| 6,054,229 | A | 4/2000 | Hsu et al. |
| 6,146,780 | A * | 11/2000 | Cisar .......... C25B 9/04 429/435 |
| 6,368,737 | B1 | 4/2002 | Margiott |
| 6,528,197 | B1 | 3/2003 | De-Haart et al. |
| 2002/0102188 | A1 | 8/2002 | Hsu et al. |
| 2003/0039877 | A1 | 2/2003 | Dufner et al. |
| 2003/0148164 | A1 | 8/2003 | Koch et al. |
| 2003/0190512 | A1 | 10/2003 | Takahashi et al. |
| 2004/0058230 | A1 | 3/2004 | Hsu et al. |
| 2004/0258973 | A1 | 12/2004 | Grasso et al. |
| 2005/0255365 | A1 | 11/2005 | Ikezoe |
| 2006/0188774 | A1 | 8/2006 | Niu et al. |
| 2006/0199061 | A1 | 9/2006 | Fiebig et al. |
| 2008/0160366 | A1 | 7/2008 | Allen et al. |
| 2008/0292939 | A1 | 11/2008 | Xie |
| 2010/0021777 | A1 | 1/2010 | Gottesfeld et al. |
| 2010/0285386 | A1 | 11/2010 | Wang |
| 2011/0076590 | A1 | 3/2011 | Kozakai et al. |
| 2011/0229787 | A1 | 9/2011 | Kozakai et al. |
| 2012/0040259 | A1* | 2/2012 | Tomura ............ H01M 8/0265 429/414 |
| 2012/0082915 | A1 | 4/2012 | Kozakai et al. |
| 2012/0321991 | A1* | 12/2012 | Gottesfeld ......... H01M 8/0289 429/482 |
| 2013/0062196 | A1 | 3/2013 | Sin |

FOREIGN PATENT DOCUMENTS

| | | |
|---|---|---|
| EP | 1715538 | 10/2006 |
| FR | 2891090 | 3/2007 |
| JP | S55139842 | 11/1980 |
| JP | S55141580 | 11/1980 |
| JP | S5867878 | 4/1983 |
| JP | S5896886 | 6/1983 |
| JP | H07 45294 | 2/1995 |
| JP | H1171692 | 3/1999 |
| JP | 2010 049912 | 3/2010 |
| JP | 6338338 | 3/2015 |
| WO | WO 2009149195 | 12/2009 |
| WO | WO 13/047485 | 4/2013 |
| WO | WO 2015175656 | 11/2015 |

OTHER PUBLICATIONS

Pan J. et al. "High-Performance Alkaline Polymer Electrolyte for Fuel Cell Applications". Advanced Functional Materials, vol. 20, Issue 2, pp. 312-319.

Office Action of IL Application No. 244698, dated Oct. 25, 2016.

Gulzow et al. "Bipolar Concept for Alkaline Fuel Cells", Journal of Power Sources, 156 (2006), 1-7.

Heinzel et al. "Fuel Cells-Proton-Exchange Membrane Fuel Cells", Bipolar Plates, Jan. 1, 2009, 810-816.

Shiau et al. "Water Management in an Alkaline Exchange Membrane Fuel Cell", ECS Transactions, vol. 69, No. 17, Oct. 2, 2015, pp. 985-994.

International Search Report of PCT Application No. PCT/IL2017/050356, dated Jul. 18, 2017.

* cited by examiner

ALKALINE EXCHANGE MEMBRANE FUEL CELLS SYSTEM HAVING A BI-POLAR PLATE

CROSS-REFERENCE TO RELATED APPLICATIONS

This application is a National Phase Application of PCT International Application No. PCT/IL2017/050356, International Filing Date Mar. 21, 2017, entitled "ALKALINE EXCHANGE MEMBRANE FUEL CELLS SYSTEM HAVING A BI-POLAR PLATE", published on Sep. 28, 2017 under Publication No. WO 2017/163244, which claims priority of Israel Patent Application No. 244698, filed Mar. 21, 2016, all of which are hereby incorporated by reference in their entireties.

BACKGROUND OF THE INVENTION

Fuel cells are portable reliable sources of clean energy. Unlike batteries, fuel cells can continuously operate as long as fuel (e.g., hydrogen) and oxidant (e.g., oxygen) are supplied to the cell. These properties make fuel cells promising energy sources for the automotive and the aerospace industries and as stationary backup systems. One of the most promising and efficient fuel cell types is the Proton Exchange Membrane Fuel Cell (PEM FC) illustrated in FIG. 1. A PEM FC 100 includes an anode 10 configured to generate hydrogen ions (H+) and electrons from hydrogen gas, a cathode 20 configured to generate water from the hydrogen ions, oxygen and electrons and a membrane 30 configured to transfer the hydrogen ions (i.e., protons) from anode 10 to cathode 20. PEM FC 100 may further include a conductor (not illustrated) for conducting electrons (electricity) from the anode to the cathode.

Figure 1:
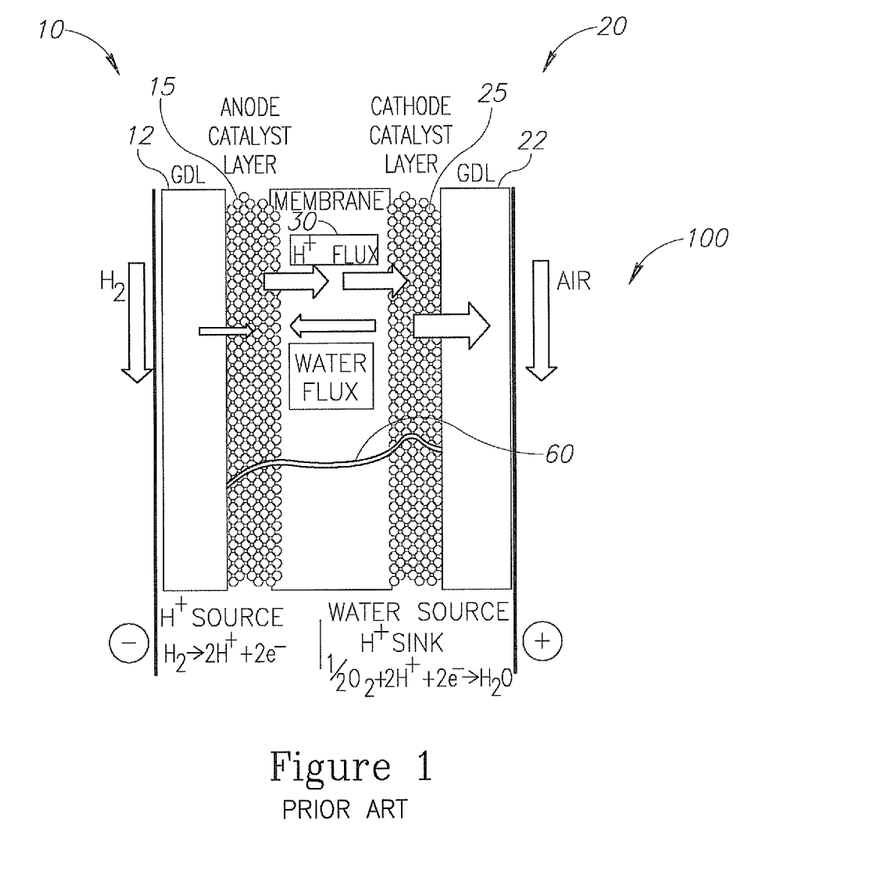
FIG. 1 is an illustration of a Proton Exchange Membrane Fuel Cell (PEM FC)

Anode 10 may include a gas diffusion layer (GDL) or gas diffusion electrode (GDE) 12 that includes, for example, carbon paper GDL. Anode 10 may include an anode catalyst layer 15 that is configured to oxidize the hydrogen into positively charged hydrogen ions (H$^+$) and negatively charged electrons (e$^-$). In some embodiments, membrane 30 may be directly coated with anode catalyst layer 15 in a catalyst coated membrane (CCM) type FC. In a PEM FC anode hydrogen oxidation reaction, water is not a reactant, however, humidified conditions are needed in order to conduct the H$^+$ ions from the anode to the cathode through the membrane. The anode chemical reaction is:

$$H_2 \rightarrow 2H^+ + 2e^- \qquad \text{I.}$$

Anode catalyst 15 may be made of noble metals, for example, fine platinum powder.

Cathode 20 may include a gas diffusion layer (GDL) or gas diffusion electrode (GDE) 22 that includes, for example, a carbon paper GDL. Cathode 20 may include a cathode catalyst layer 25 that may be configured to generate water from the hydrogen ions, oxygen and electrons received via a conductor that electrically connects the anode to the cathode. In some embodiments, membrane 30 may be directly coated with cathode catalyst layer 25 in a catalyst coated membrane (CCM) type FC. The cathode chemical reaction is:

$$\tfrac{1}{2}O_2 + 2H^+ + 2e^- \rightarrow H_2O \qquad \text{II.}$$

Membrane 30 may be a proton-conducting polymer membrane made from, for example, NafionR which act as semi-solid electrolyte. The membrane is configured to block the migration of electrons while allowing the migration of H$^+$ ions.

In a PEM FC 100 water is continually being produced under current at the cathode while the H$^+$ ions drag water molecules from the vicinity of the anode towards the cathode. These processes results in: 1) drying of the anode side and 2) water build up on the cathode side, therefore, creating a gradient in water level across the cell having higher water level in the vicinity of cathode 20 than in the vicinity of anode 10, as illustrated in graph 60 of FIG. 1. Graph 60 illustrates a schematic water level across PEM FC 100 from the anode to the cathode. An exemplary variation of water level (in number of water molecules per membrane 30 ionic site) may exhibit drop between the cathode and the anode from 12 to 7 water molecules per ionic site. PEM FC 100 may further include a cooling system including streams for releasing the heat that forms during the electrochemical reactions.

Figure 2A:
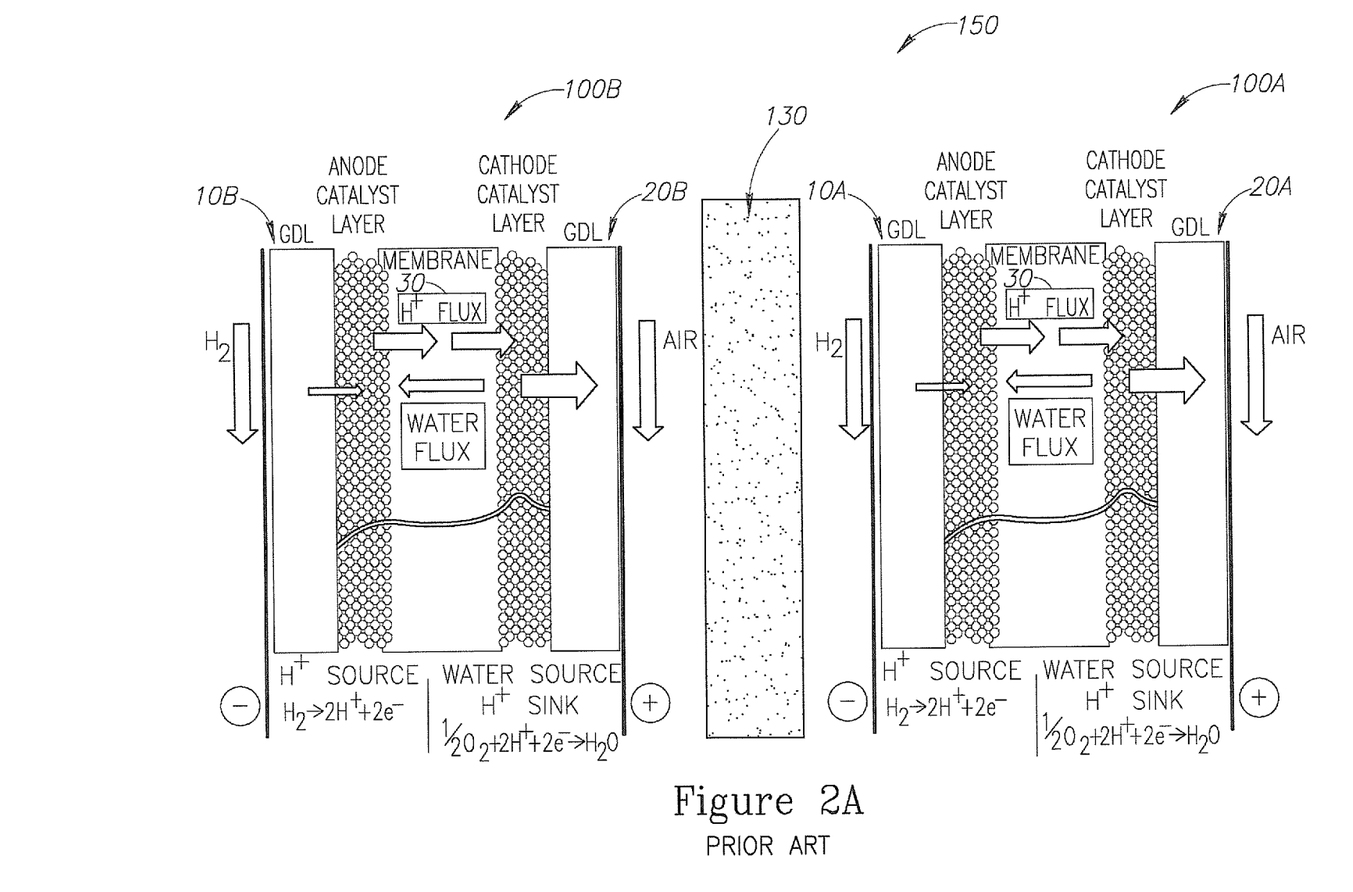
FIG. 2A is an illustration of a system of PEM FCs.

Solution for the uneven water distribution disclosed above may be provided by using a porous bi-polar plate (BPP) between two adjacent PEM FCs, as illustrated in FIG. 2A. FIG. 2A is an illustration of a system of PEM FCs. System 150 may include two or more PEM FC 100A and 100B, and at least one porous BPP 130 located between an anode 10A of PEM FC 100A and a cathode 20B of PEM FC 100B. The aim of porous BPP 130 is cooling the anode and cathode while managing the water in the PEM FC system 150 to achieve more even water distribution across the cell dimension. Porous BPP 130 includes fine pores that are water-saturated under cell operation conditions, in order to prevent reactants (e.g., H$_2$ and O$_2$ or Air) from crossing over between adjacent cells. In some embodiments, porous BPP 130 may include a conductive material for conducting electricity between adjacent cells 100.

Figure 2B:
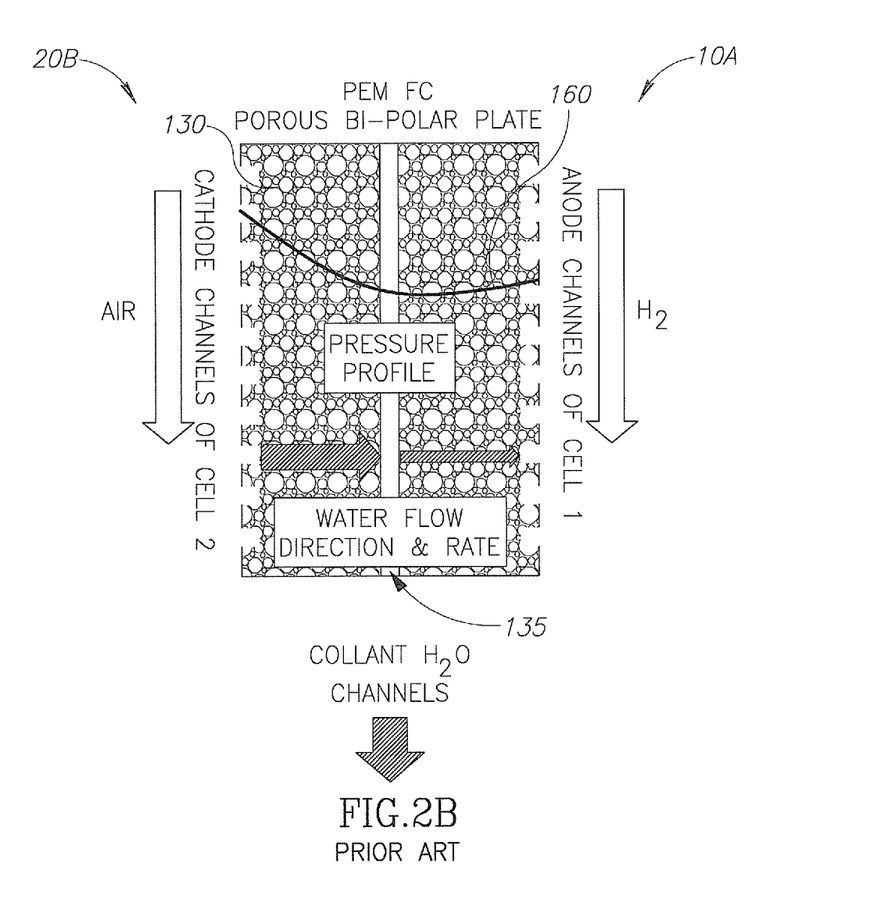
FIG. 2B is an illustration of a BPP is the system of FIG. 2A.

In some embodiments, the PEM FC system 150 may include two or more pairs of PEM FC 100A and 100B and all porous conductive BPPs 130 located between each pair of PEM FC 100A and 100B included in system 150 and configured to conduct electricity between cathode 20B and anode 10A. The electrical circuit may include two conductors (not illustrated) electrically connected to the anode 10 of the first external FC 100 (e.g., 100B when system 150 include two FCs) and cathode 20 of the last external FC 100 (e.g., FC 100B when system 150 include two FCs). The conductors may conduct the generated electricity from system 150. Additionally, porous BPP 130 is used to remove product water by capillarity and pressure difference away from cathode 20B side into the cooling water stream in porous BPP 130 in order to prevent cathode 20B flooding, and at the same time, moving cooling water by capillarity and pressure difference toward the anode 10A in order to maintain proper humidity condition at anode 10A, as illustrated in FIG. 2B. In some embodiments, porous BPP 130 may include one or more cooling channels 135 (illustrated in FIG. 2B) for channeling cooling water stream for cooling anode 10A and cathode 20B.

FIG. 2B is an illustration of BPP 130. Graph 160 is an illustration of a schematic pressure profile across BPP 130 from the vicinity of cathode 20B (e.g., near Air or O$_2$ channels) to the vicinity of anode 10A (e.g., near H$_2$ channels). The pressure profile is affected by three main pressures: the Hydrogen gas pressure near anode 10A, the air pressure near cathode 20B and the cooling water pressure following in cooling channels 135 (e.g., coolant stream) in BPP 130. Typical pressure differences between anode 10A and cathode 20B to cooling water stream in a system such as system 200 are: 0.05-0.7 bar. In system 200 the air is applied at a higher pressure than the Hydrogen.

During the operation of system 150 it will be required to extract the excess water removed from cathode 20B into BPP 130 and added thus accumulated at the cooling stream. Accordingly, water will have to be periodically extracted from the cooling stream.

Figure 3:
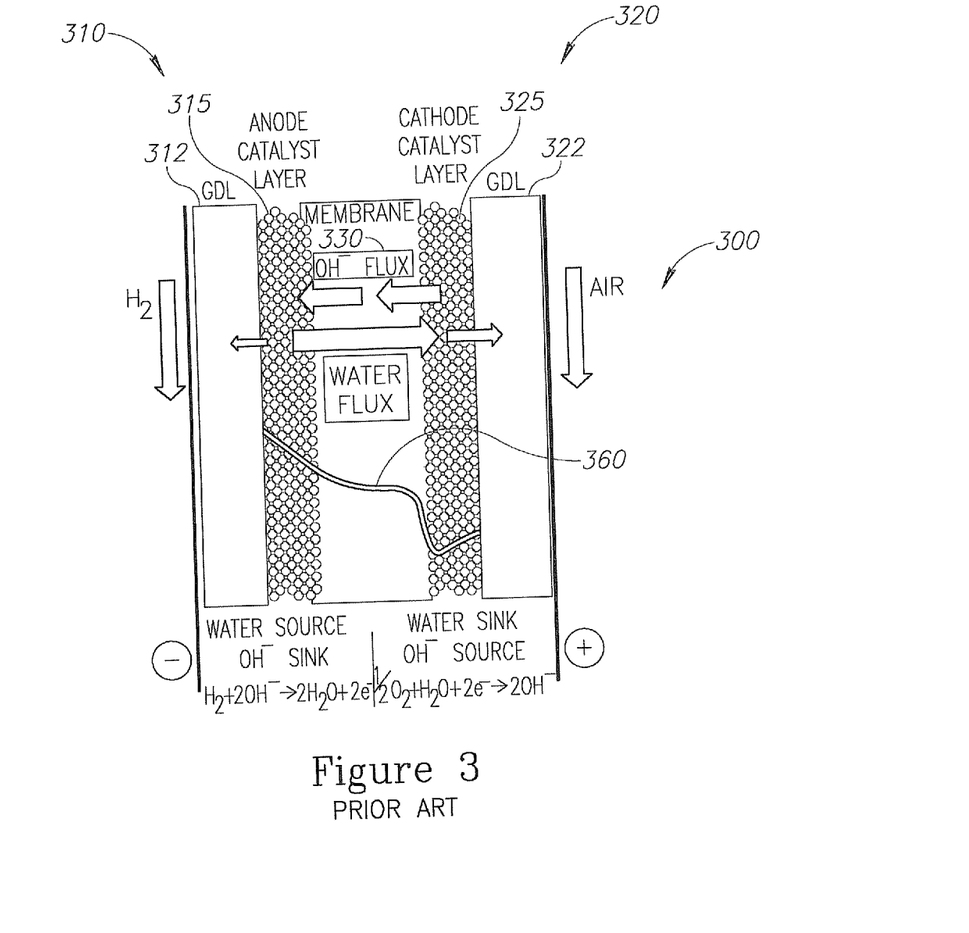
FIG. 3 is an illustration of an Alkaline Exchange Membrane Fuel Cell (AEM FC)

An even more cost effective fuel cell than the PEM FC is the Alkaline Exchange Membrane Fuel Cell (AEM FC). An exemplary AEM FC is illustrated in FIG. 3. AEM FC 300 may include a cathode 320 configured to generate hydroxide ions (OH$^-$) from water, electrons and oxygen, an anode 310 configured to generate water and electrons from the hydroxide ions and hydrogen and an alkaline exchange membrane 330 configured to transfer the hydroxide ions from cathode 320 to anode 310, and to transfer water from a vicinity of anode 310 to a vicinity of cathode 320. AEM FC 300 may further include a conductor (not illustrated) for conducting electrons (electricity) from the anode to the cathode.

Cathode 320 may include a gas diffusion layer (GDL) 322, for example, carbon paper based, or gas diffusion electrode (GDE) 322, and a cathode catalyst layer 325. The cathode reaction in AEM FC is:

$$\tfrac{1}{2}O_2 + H_2O + 2e^- \rightarrow 2OH^- \qquad \text{III.}$$

Catalyst layer 325 may include any material that is configured to enhance the reaction of water with oxygen and electrons to form hydroxide ions. Cathode catalyst layer 325 of AEM FC may include inexpensive, non-noble metal such as silver, iron, nickel, metal-oxides or the like, in comparison to the expensive platinum used as a catalyst in the PEM FC cathode. In some embodiments, membrane 330 may be directly coated with cathode catalyst layer 325 in a catalyst coated membrane (CCM) type FC.

Anode 310 may include a gas diffusion layer (GDL) 312, for example, carbon paper based GDL 312, or gas diffusion electrode (GDE) 312 and an anode catalyst layer 315. Catalyst layer 315 may include any material that is configured to enhance the reaction of hydroxide ions with hydrogen to produce water and electrons, according to reaction IV.

$$H_2 + 2OH^- \rightarrow 2H_2O + 2e^- \qquad \text{IV.}$$

Such materials may include relatively inexpensive, non-noble metal catalyst, such as nickel, which is much less expensive than the platinum used in the anode catalyst layer in PEM FC. Alkaline exchange membrane FCs 330 may include a solid polymer electrolyte that can conduct hydroxide ions and water molecules. An exemplary alkaline exchange membrane 330 may include alkaline ionomeric material and inactive polymer mesh support, or the like Alkaline exchange membrane 330 may allow a portion of the water formed in anode 310 to be transferred to the vicinity of cathode 320 and to participate in the reaction in cathode 320. Unlike PEM FC 100 and PEM FCs system 150, the operation of AEM FC 300 involves water in both the cathode and anode reactions. Water is generated on the anode side in the AEM FC at a rate of 2 H$_2$O molecules per electron. This is twice the water generation rate in the PEM FC cathode. Furthermore, water is consumed in the cathode process at a rate of one H$_2$O molecule per electron. This may create a challenging water management in the AEM FC in comparison to PEM FC. Therefore, in AEM FC 300 it is essential to be able to remove the excess water formed on anode 310 while supplying to cathode 320 a sufficient amount of water from the anode for forming the hydroxide ions.

Previous design of the AEM PC taught transport of water from the anode to the cathode of an AEM FC through the cell membrane as the preferred approach to achieving the desired water management in AEM FCs. This approach may provide a satisfactory solution based on the water permeability of presently available AEM ionomers, only when the AEM cell operates at relatively low currents, e.g., lower than 0.5 A/cm$^2$. At higher operation currents relaying of the AEM membrane alone as the water transport conduit becomes problematic, in particular, when cell currents exceeding about 1 A/cm$^2$ because the demanded rate of water transport through the membrane may exceed the permeability of presently available AEMs.

Under constant current operation of an AEM FC (such as AEM 300), the water level in the vicinity of anode 310 is expected to be significantly higher than the water level in and near cathode 320, as illustrated schematically in graph 360 of FIG. 2. An exemplary water level drop (in number of water molecules per membrane 330 ionic conduction site) may drop between the cathode and the anode from 20 to 10 water molecules per site in comparison to the reverse water level drop of the PEM FC of 12 to 7 water molecules per site between the cathode and the anode sides discussed above.

In spite of the expected gradient of water level in AEM FC supply of sufficient water to the water consuming cathode of the AEM FC (e.g., to reaction III) is a major challenge, since the rate of water loss at the cathode is, in fact, significantly higher than the rate of water consumption by the cathode process. Some water loss may occur due to the supply of sub-saturated air (as the oxygen source) to the cathode active area. The sub-saturated air may cause the evaporation of some of the water at the cathode's exhaust (not illustrated in FIG. 3), thus may contribute to the "cathode dry-out" phenomena. One option of compensating for this loss is to recover the evaporated water using a water exchanger acting to transfer water from the cathode exhaust to the cathode inlet (not illustrated in FIG. 3). This arrangement requires the use of an additional external component and does not provide fully water saturated air, that may fully prevent the "cathode's dry-out" phenomena. When using a plurality of AEM FCs in a single system such an arrangement complicates the system.

SUMMARY OF THE INVENTION

Embodiments of the invention may be related to a system of alkaline exchange membrane fuel cells and a method of operating such system. The system may include a first fuel cell and a second fuel cell adjacent to the first fuel cell. In some embodiments, each of the first and second fuel cells may include: a cathode configured to generate hydroxide ions from water, oxygen and electrons, an anode configured to generate water and electrons from the hydroxide ions and hydrogen received from a hydrogen source, and an alkaline exchange membrane configured to transfer the hydroxide ions from the cathode to the anode, and to transfer water from a vicinity of the anode to a vicinity of the cathode. In some embodiments, the system may further include a first porous bi-polar plate located between the anode of the first fuel cell and the cathode of the second fuel cell and configured to transfer excess water from the vicinity of the anode of the first fuel cell to the vicinity of the cathode of the second fuel cell.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some aspect of the invention may be related to a system of fuel cells for producing electricity. A system according to some embodiments of the invention may include two or more AEM FCs, such as, AEM FC 300 illustrated and discussed with respect to FIG. 3. Such a system may further include at least one bi-polar plate (BPP) located between an anode of a first AEM FC and a cathode of a second AEM FC and configured to transfer excess water from the vicinity of the anode of the first AEM FC to the vicinity of the cathode of the second AEM FC.

In some embodiments, the system may further include a cooling water stream flowing between the first and second AEM FCs via cooling channels in the BPP. The excess water formed in the anode may be transferred from the anode of the first AEM FC to the cathode of the second AEM FC via the bi-polar plate, thus mixing with the cooling water stream. In spite of the mixing of the excess water with the cooling water stream, the total amount of cooling water stream in the system may be kept substantially constant, due to the efficient passage of the excess water in the BPP and due to the consumption of the transferred water by the reaction (e.g., reaction III) taking place in the cathode. In some embodiments, the bi-polar plate may be made or include a porous material. Any excess water buildup in the system can be released as required from the cooling channels to the environment.

Figure 4A:
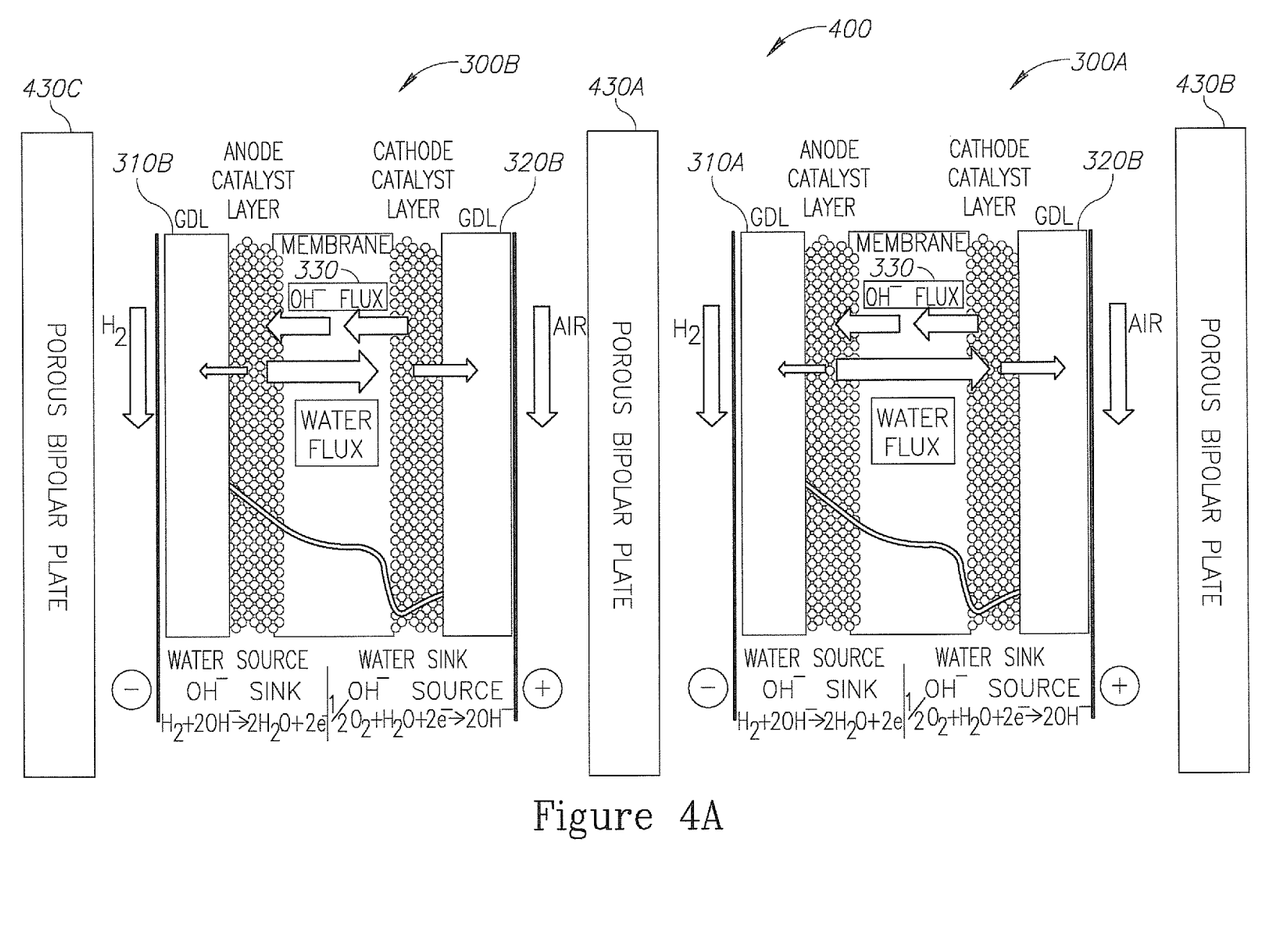
FIG. 4A is an illustration of a system of fuel cells according to some embodiments of the invention.

Reference is now made to FIG. 4 that is an illustration of a system of fuel cells according to some embodiments of the invention. System 400 may include a first fuel cell 300A and a second fuel cell 300B adjacent to first fuel cell 300 A. Fuel cells 300A and 300B may be AEM FCs and may include substantially the same components as fuel cell 300 illustrated and discussed with respect to FIG. 3. A system according embodiments of the invention may include a plurality of AEM FCs 300 having any number of AEM FCs, thus the invention as a whole is not limited to the two or three AEM FCs 300 illustrated in FIG. 4A. The system may include a stack of AEM FCs 300. Each of fuel cells 300A and 300B may include a cathode 320A or 320B that may be configured to generate hydroxide ions from water, oxygen and electrons, and an anode 310A or 310B that may be configured to generate water and electrons from the hydroxide ions and hydrogen received from a hydrogen source. In some embodiments, the hydrogen source may include at least one of: hydrogen gas (as illustrated), ammonia and cracked ammonia. Each of fuel cells 300A and 300B may further include an alkaline exchange membrane 330A or 330B that may be configured to transfer the hydroxide ions from the cathode to the anode, and to transfer water from a vicinity a of anode to a vicinity of the cathode. Membranes 330A or 330B may be configured to transfer only a portion of the water generated on the anodes 310A and 310, therefore forming an elevated water level at the vicinity of anodes 310A and 310B.

In some embodiments, in order to reduce the water level at the vicinity of anodes 310A and 310B and to supply water to reaction III on cathodes 320A and 320B excess water may be transferred from the vicinity of anode 310A to the vicinity of cathode 320B In some embodiments, system 400 may further include a first BPP 430A located between anode 310A of first fuel cell 300A and cathode 320B of second fuel cell 300B. BPP 430A may be configured to transfer excess water from the vicinity of anode 310A to the vicinity of cathode 320B. In some embodiments, using BPP 430A (and/or 430B and 430C) may allow operating AEM FCs 300A and 300B at relatively high currents (e.g., higher than 1 $A/cm^2$) allowing an effective anode-to-cathode water transport rate, higher than the possible water transport rate through cell membrane 330A or 330B alone. In some embodiments, the effective anode-to-cathode water transport may allow to supply to cathodes 320A and 320B air (or other oxygen source) saturated with water to a level that may not cause the "cathode's dry-out" phenomena.

BPP 430A may include a conductive porous material, for example, Aluminum, Nickel, Graphite, Stainless Steel, and Titanium or their alloys. BPP 430A may conduct electricity between AEM FCs 300A and 300B. The pores of the porous material may allow the controlled migration of water, defined by capillary processes and pressure differences (discussed with respect to FIG. 4B below) from one side of the BPP to the other. In some embodiments, BPP 430A may include other elements that may allow such a migration.

In some embodiments, the electrical circuit of AEM FC system 400 may include the two or more AEM FC 300A and 300B and all conductive porous BPPs 430 located between each pair of PEM FC 300A and 300B included in system 400. The electrical circuit may include two conductors (not illustrated) electrically connected to the anode 310 of the first external FC 300 (e.g., 300B when system 400 include two FCs) and cathode 320 of the last external FC 300 (e.g., FC 300B when system 400 include two FCs). The conductors may assist in conducting the generated electricity from system 400.

In some embodiments, system 400 may include a cooling water channels 435 (illustrated in FIG. 4B) flowing between first and second fuel cells 300A and 300B via first bi-polar plate 430A. The cooling water stream flowing in cooling channels 435 may mix with the excess water generated in the vicinity of anode 310A and transferred via BPP 430A to the vicinity of cathode 320B. In spite the mixing of the two water sources, in some embodiments, the amount of water in the cooling water stream in cooling channels 435 may be kept substantially constant throughout a lifecycle of system 400. That is due to the effectiveness of the transformation of water from anode 310A to cathode 320B via BPP 430A and the consumption of the transferred water by the reaction (e.g., reaction III) taking place in cathode 320B. In comparison to PEM FCs (e.g., cell 100 and/or system 200) that most of the water produced on cathode 20 must be evacuated in order to avoid flooding of cathode 20 and the PEM FC 100, in system 400 substantially no water needs to be evacuated. Therefore, a system like system 200 may have to periodically extract water from the cooling water stream as oppose to the system 400.

Figure 4B:
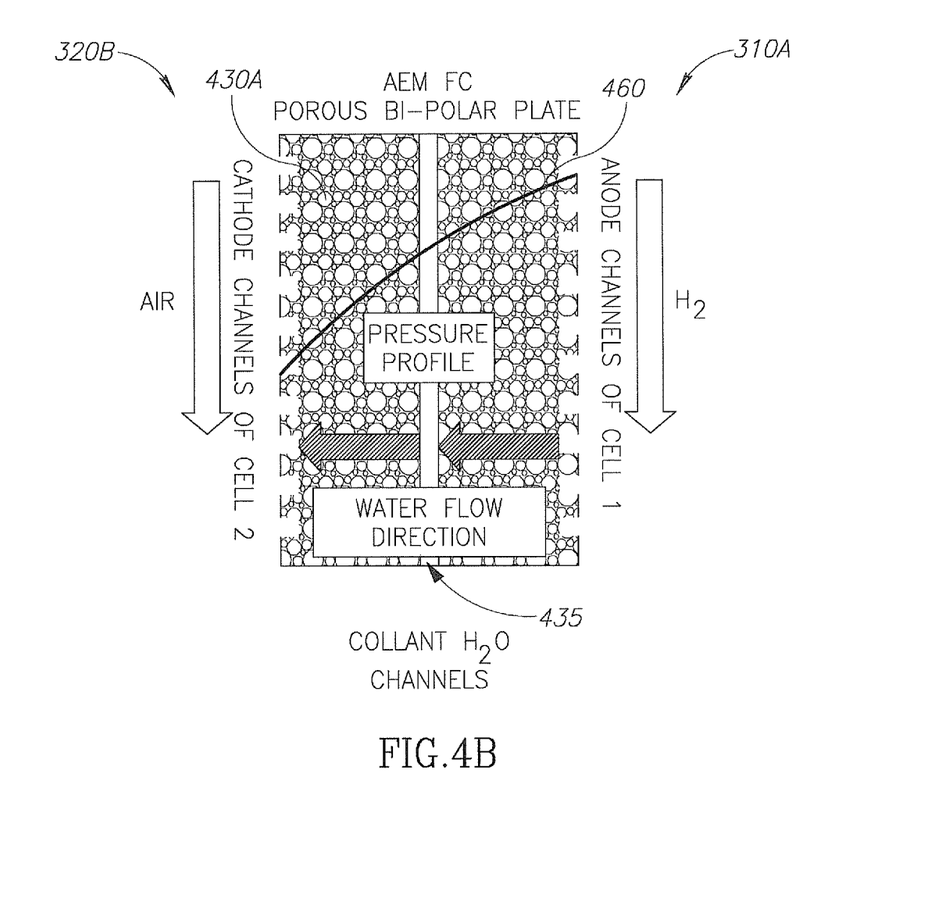
FIG. 4B is an illustration of a BPP in the system of FIG. 4A according to some embodiments of the invention.

FIG. 4B is an illustration of n BPP 430A according to some embodiments of the invention. Graph 460 is an illustration of the pressure profile across BPP 430A from the vicinity (e.g., Air or $O_2$ channels) of cathode 320B to the vicinity (e.g., $H_2$ channels) of anode 310A. The pressure profile may be affected from three main pressures: the Hydrogen gas pressure near anode 310A, the air pressure near cathode 320B and the cooling water pressure in the cooling channels 435 (e.g., coolant stream) in BPP 430A. As opposed to the pressure profile in BPP 130 of PEM FC system 200 that drops from high level near cathode 20B, decreases towards the middle section of BPP 130 and then increases towards anode 10A, the pressure profile in BPP 430 of AEM FC system 400 has an opposite slope and drops from high level near anode 310A towards low level near cathode 320B.

In some embodiments, the operation of AEM FC system 400 may include providing the Hydrogen to the system at pressure higher than the provided air pressure, for example, providing Hydrogen at 2-3.5 barg (gauge pressure) and providing air at approximately 1 barg. As a result the water pressure in BPP 430A drops from high values near anode 310A to much lower values near cathode 320B. This pressure drop helps the transport of the excess water generated at anode 310A to the vicinity of cathode 320B.

In some embodiments, system 400 may include a third AEM FC (not illustrated). The third FC may include substantially the same components as AEM FC 300A and 300B. System 400 may further include a second BPP 430B (or 430C) located between the cathode of the first fuel cell (e.g., cathode 320A) and the anode of the third fuel cell and configured to transfer access water from the vicinity of the anode of the third fuel cell to the vicinity of the cathode of the first fuel cell. In some embodiments, BPP 430B (and/or 430C) is substantially the same as bi-polar plate 430A discussed above. In some embodiments, system 400 may include more than 3 AEM FCs 300 and more than BPP 340.

Figure 5:
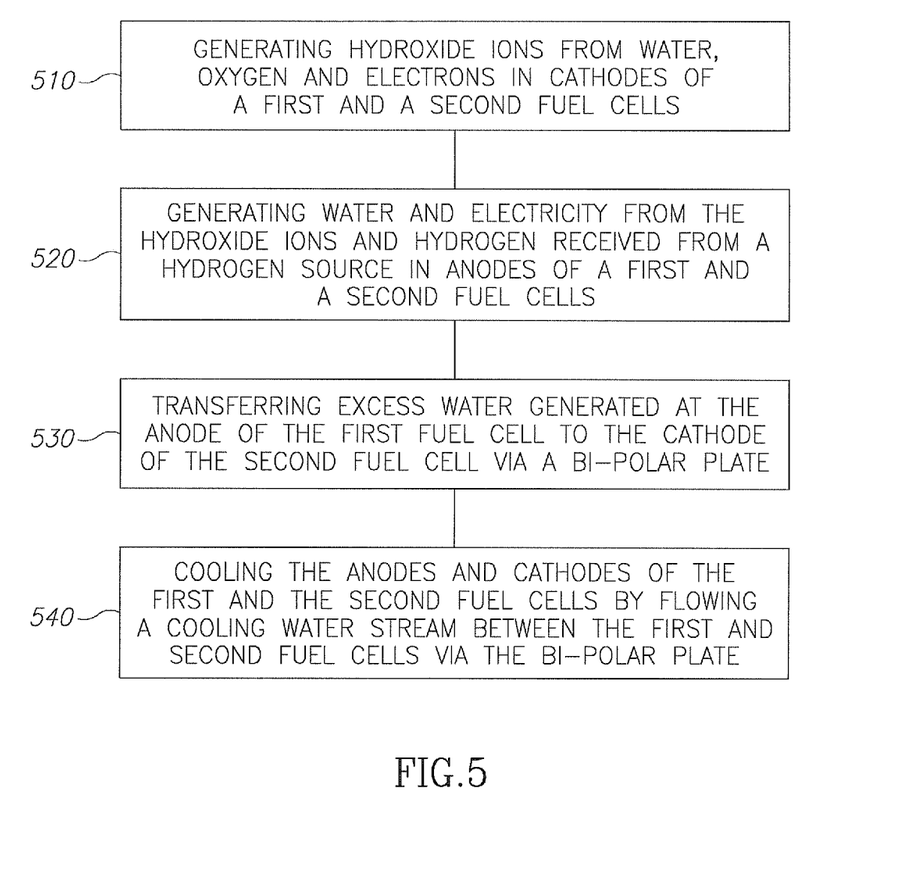
FIG. 5 is a method of operating a fuel cell according to some embodiments of the invention.

Reference is now made to FIG. 5 that is a flowchart of a method of operating a fuel cells system according to some embodiments of the invention. The fuel cells system may be AEM fuel cells system 400 discussed above. In box 510, the method may include generating hydroxide ions from water, oxygen and electrons in cathodes (e.g., cathodes 320A and 320B) of a first and a second fuel cells (e.g., AEM FCs 300A and 300B). The hydroxide ions may be generated by reaction III. In box 520, the method may include generating water and electrons from the hydroxide ions and hydrogen received from a hydrogen source at the anodes (e.g., anodes 310A and 310B) of a first and a second fuel cells (e.g., AEM FCs 300A and 300B). The water and electrons may be generated by reaction IV.

In box 530, the method may include transferring excess water generated at the anode (e.g., anode 310A) of the first fuel cell (e.g., AEM FC 300A) to the cathode (e.g., cathode 320B) of the second fuel cell (e.g., AEM FC 300B) via a bi-polar plate (e.g., plate 430) located between the anode of the first fuel cell and the cathode of the second fuel cell. The bi-polar plate may include porous material, fine tubes or any other structure that may allow water to be transferred by capillary forces and pressure differences from one side to the other side of the bi-polar plate.

In box 540, the method may include cooling the anodes and cathodes of the first and the second fuel cells by flowing cooling water stream between the first and second fuel cells via the bi-polar plate. The cooling water stream may flow in the pores of the porous plate or at designated channel made in the bi-polar plate. In some embodiments, the amount of water in the cooling water stream may be kept substantially constant throughout a lifecycle of the system. Since the bi-polar plate is configured both to allow a flow of cooling water and transfer excess water from anode 310A to cathode 320B the total amount of cooling water in system 400 may be kept constant, although the excess water stream and the cooling water stream are mixed together.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system comprising:
a first fuel cell;
a second fuel cell adjacent to the first fuel cell,
wherein each of the first and second fuel cells comprises:
a cathode configured to generate hydroxide ions from water, oxygen and electrons;
an anode configured to generate water and electrons from the hydroxide ions and hydrogen received from a hydrogen source; and
an alkaline exchange membrane configured to transfer the hydroxide ions from the cathode to the anode, and to transfer water from a vicinity of the anode to a vicinity of the cathode; and
a first bi-polar plate located between the anode of the first fuel cell and the cathode of the second fuel cell and configured to transfer excess water from the vicinity of the anode of the first fuel cell to the vicinity of the cathode of the second fuel cell,
wherein a pressure profile across the first bi-polar plate drops from higher level near the anode of the first fuel cell to lower level near the cathode of the second fuel cell.

2. The system according to claim 1, further comprising a cooling water stream flowing between the first and second fuel cells via the first bi-polar plate.

3. The system according to claim 2, wherein the amount of water in the cooling water stream is kept substantially constant throughout a lifecycle of the system.

4. The system of claim 1, wherein the first bi-polar plate comprises a porous material.

5. The system according to claim 4, wherein the porous material is made from at least one of: aluminum, nickel, stainless steel, and graphite.

6. The system of claim 1, further comprising:
a third fuel cell adjacent to the first fuel cell, the third fuel cell comprises:
   a cathode configured to generate hydroxide ions from water, oxygen and electrons;
      an anode configured to generate water and electrons from the hydroxide ions and hydrogen received from a hydrogen source; and
      an alkaline exchange membrane configured to transfer the hydroxide ions from the cathode to the anode, and to transfer water from a vicinity of the anode to a vicinity of the cathode; and
      a second hi-polar plate located between the cathode of the first fuel cell and the anode of the third fuel cell and configured to transfer excess water from the vicinity of the anode of the third fuel cell to the vicinity of the cathode of the first fuel cell,
   wherein a pressure profile across the second bi-polar plate drops from higher level near the anode of the third fuel cell to lower level near the cathode of the first fuel cell,
   and wherein the first bi-polar plate and the second bi-polar plate are substantially the same.

7. The system of claim 1, wherein the hydrogen source is at least one of: hydrogen gas, ammonia and cracked ammonia.

8. A method of operating a fuel cells system, comprising:
generating hydroxide ions from water, oxygen and electrons on the cathodes of a first and a second fuel cells;
generating water and electrons from the hydroxide ions and hydrogen received from a hydrogen source on the anodes of the first and the second fuel cells; and
transferring excess water generated at the anode of the first fuel cell to a vicinity of the cathode of the second fuel cell via a bi-polar plate located between the anode of the first fuel cell and the cathode of the second fuel cell, by forming a pressure profile across the first bi-polar plate that drops from higher level near the anode of the first fuel cell to lower level near the cathode of the second fuel cell,
wherein each of the first and second fuel cells further comprises: an alkaline exchange membrane configured to transfer the hydroxide ions from the cathode to the anode, and to transfer water from a vicinity of the anode to a vicinity of the cathode.

9. The method of claim 8, further comprising:
cooling the anodes and cathodes of the first and the second fuel cells by flowing a cooling water stream between the first and second fuel cells via the bi-polar plate.

10. The method of claim 9, wherein an amount of water in the cooling water stream is kept substantially constant throughout a lifecycle of the system.

* * * * *

UNITED STATES PATENT AND TRADEMARK OFFICE
CERTIFICATE OF CORRECTION

PATENT NO. : 10,916,789 B2  
APPLICATION NO. : 16/085648  
DATED : February 9, 2021  
INVENTOR(S) : Yair Paska et al.

Page 1 of 1

It is certified that error appears in the above-identified patent and that said Letters Patent is hereby corrected as shown below:

On the Title Page

Item [72] delete:  
"Yair Benjamine, Petah Tikva (IL)"  
And insert:  
--Yair Benjamin, Petah Tikva (IL)--

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*